Patented Jan. 8, 1952

2,581,972

UNITED STATES PATENT OFFICE 2,581,972

PREPARATION OF 2-CHLORO-4-METHOXY-5-NITRO-TOLUENE AND 2-CHLORO-4-METHOXY-5-AMINOTOLUENE

Bernard William Rottschaefer, East Greenbush, N. Y., assignor to General Aniline & Film Corporation, New York, N. Y., a corporation of Delaware No Drawing. Application December 22, 1948, Serial No. 66,828

8 Claims. (Cl. 260—612)

This invention relates to the preparation of 5-nitro-4-alkoxy-2-chlorotoluenes and the corresponding 5-amino-4-alkoxy-2-chlorotoluenes. More particularly, the invention relates to the preparation of 5-nitro-4-methoxy-2-chlorotoluene and 5-nitro-4-ethoxy-2-chlorotoluene, and the corresponding amino compounds.

In accordance with my invention, the aforesaid nitro compounds, which constitute new compositions of matter, are prepared by reacting 5-nitro-2,4-dichlorotoluene with an alkali metal alcoholate (i. e. sodium or potassium methylate or ethylate) in the corresponding alcohol as a medium, at temperatures substantially within the range 65–80° C., the amount of said alcoholate not substantially exceeding 1 molecular equivalent per mol of 5-nitro-2,4-dichlorotoluene. Thus, the amount of alkali metal alcoholate employed in the reaction mixture should not exceed 1.1 mol per mol of 5-nitro-2,4-dichlorotoluene. The 5-nitro-4-alkoxy-2-chlorotoluenes produced in the aforesaid reaction can be recovered from the reaction mixture, for example, by dilution with water and filtering out the precipitated reaction product, or by cooling the reaction mixture to effect crystallization of the product therefrom and separation of the product from the mother liquor. When equimolecular amounts of the reagents are used, substantially quantitative yields of 5-nitro-4-alkoxy-2-chlorotoluenes are obtained by aqueous precipitation and washing. The product thus recovered is of high purity, adequate for use as an intermediate for dyestuffs and other dyestuff intermediates without further purification. Thus, the 5-nitro-4-alkoxy-2-chlorotoluenes produced according to my process can be reduced to the corresponding 5-amino compounds, e. g. by reduction with zinc and acetic acid. The amino compounds thus obtained can be diazotized in the usual manner, by treatment with nitrous acid or compositions yielding the same, and coupled with azo coupling components for the production of azo dyestuffs.

It was known heretofore to prepare 5-amino-4-methoxy-2-chlorotoluene by a process involving acylation of the amino group of cresidine (i. e. 2-methoxy-5-methylaniline), e. g. by introduction of an acetyl or oxalyl radical, chlorination of the resulting acylated compound, and hydrolysis of the acylamino group in the resulting 5-acylamino-4-methoxy-2-chlorotoluene. However, this procedure requires a relatively expensive starting material, is relatively complicated in that it involves an acylation and saponification step, and is wasteful in that the acyl radical is eliminated and lost in the saponification. The process of this invention employs a relatively inexpensive starting material (produced by dichlorination and nitration of toluene), and involves a simple alkoxylation step followed by reduction of the nitro group.

Selective replacement of the chlorine occupying the 4-position in 5-nitro-2,4-dichlorotoluene by an alkoxy group as it occurs in the process of this invention, to form the 4-alkoxy derivative, constitutes a surprising and unexpected result, since the chlorine atom in the 2-position is also reactive toward alkali metal alcoholates. Thus, Dadswell et al. (J. C. S. 1927, p. 585) discloses that 5-nitro-2,4-dimethoxytoluene is formed by heating 5-nitro-2,4-dichlorotoluene with sodium methylate in methanol solution at 115–120° C., the amount of alcoholate being approximately 2 mols per mol of 5-nitro-2,4-dichlorotoluene. In the analogous reaction of 5-nitro-1,2,4-trichlorobenzene with sodium methylate, the corresponding 2,4-dimethoxy derivative is likewise obtained, as disclosed in German Patent 135,331. However, if only 1 mol of alkali metal methylate is reacted with 5-nitro-1,2,4-trichlorobenzene, a difficultly separable mixture of different reaction products is obtained according to the aforesaid German patent, while according to Holleman et al. (Rec. 40, 1921, pgs. 77–78), the chlorine in the 2-position rather than the 4-position is selectively replaced by a methoxyl group. Thus, the fact that selective replacement of chlorine occurs in the process of this invention, and the further fact that the chlorine atom in the 4-position rather than in the 2-position of 5-nitro-2,4-dichlorotoluene is selectively replaced by the alkoxyl group, is contrary to expectation.

Preferred methods for carrying out the process of my invention are illustrated in the following examples, wherein parts and percentages are by weight and temperatures are in degrees centigrade.

Example 1

5-nitro-2,4-dichlorotoluene is prepared by mixing 161 parts (1 mol) of 2,4-dichlorotoluene with 1000 parts of concentrated sulfuric acid at 0–5°, and slowly adding mixed acid (i. e. a mixture of 36% concentrated nitric acid and 61% concentrated sulfuric acid) containing the equivalent of 1 mol of nitric acid to the cooled sulfuric acid mixture with good agitation. When the nitration is complete, the reaction mixture is drowned in a mixture of ice and water, and the product thereby precipitated is isolated by filtration. The 5-nitro-2,4-dichlorotoluene, thus recovered, can be purified, if desired, by recrystallization from methanol.

207 parts (1 mol) of 5-nitro-2,4-dichlorotoluene were dissolved in 400 parts of methanol. A solution of 40 parts of flaked sodium hydroxide in 400 parts of methanol were added. The mixture was gradually heated to boiling temperature (about 67°) under reflux for several hours. 700 parts of methanol were then removed from the mixture by distillation. The residual reaction mixture was poured into water and the 5-nitro-4-methoxy-2-chlorotoluene thereby precipitated was recovered by filtration, and washed with water. An almost quantitative yield was thereby obtained.

By treatment of the product with zinc and aqueous acetic acid, the nitro group was reduced to an amino group, yielding 5-amino-4-methoxy-2-chlorotoluene, identical with that obtained by chlorination of acylated cresidine and hydrolysis of the acylamino group.

*Example 2*

206 parts (1 mol) of 5-nitro-2,4-dichlorotoluene were added to a solution of 56 parts (1 mol) of potassium hydroxide in 950 parts of methanol at 45°. The mixture was heated to boiling under reflux (67°) for 48 hours, and then cooled to 5°. The product which crystallized out was separated by filtration and washed with 400 parts of 70% aqueous methanol at 0-5°. The product was then slurried with 700 parts of water, separated from the water by filtration, washed with water, and dried at about 40°. Upon analysis, the chlorine content was found to be 17.9%, as compared with theoretical value of 17.6%, indicating that the product had a purity of about 98-99%. The product was recovered in the form a a light yellow finely crystalline powder identical in composition with that obtained in Example 1.

Upon reduction of the product as described in Example 1, to the corresponding amino compound, 5-amino-4-methoxy-2-chlorotoluene was obtained, which upon diazotization and coupling with a series of azo coupling components, yielded dyestuffs identical to those similarly produced with a known sample of 5-amino-4-methoxy-2-chlorotoluene obtained by previously known prior art processes.

By substituting ethanol for methanol in the alkylation reaction of the foregoing examples, and heating the mixture to a reaction temperature within the range 65-80° C., the corresponding 5-nitro-4-ethoxy-2-chlorotoluene can be obtained, which likewise yields the corresponding amino compound on reduction with zinc and acetic acid.

The alkali metal alcoholate employed in the alkylation reaction of this invention can be prepared either by dissolving an alkali metal hydroxide in the corresponding alcohol or, if desired, it can be made by reacting an equivalent amount of alkali metal with the alcohol.

Equimolecular amounts of alkali metal alcoholate or alcoholic alkali metal hydroxide solution and of 5-nitro-2,4-dichlorotoluene are preferably employed. However, at the aforesaid temperature range of 65-80° C., a slight excess (up to 10%) of alkali metal alcoholate does not impair the purity of the product. Use of less than equimolecular amounts of alkali metal alcoholates, however, yields mixtures of 5-nitro-4-alkoxy-2-chlorotoluene with unreacted 5-nitro-2,4-dichlorotoluene which are relatively inconvenient to separate, and reaction under these conditions is preferably avoided.

The products obtained are of sufficient purity to serve as azo dyestuff intermediates without special purification other than precipitation and washing. However, if further purification is desired, it can be effected by recrystallizing the 5-nitro-4-alkoxy-2-chlorotoluenes from organic solvents, e. g., from alcohol.

Variations and modifications which will be obvious to those skilled in the art can be made in the foregoing procedure without departing from the scope or spirit of the invention.

I claim:

1. A process for the preparation of 5-nitro-4-alkoxy-2-chlorotoluene, wherein the alkoxy group contains 1-2 carbon atoms, which comprises reacting 5-nitro-2,4-dichlorotoluene with an alkali metal alcoholate, of the class consisting of alkali metal methylates and alkali metal ethylates, in the corresponding alcohol as a medium, at a temperature from 65-80° C., the amount of said alcoholate not substantially exceeding 1 mol per mol of 5-nitro-2,4-dichlorotoluene.

2. A process for the preparation of 5-nitro-4-alkoxy-2-chlorotoluene, wherein the alkoxy group contains 1-2 carbon atoms, which comprises reacting 5-nitro-2,4-dichlorotoluene with a substantially equimolecular amount of an alkali metal alcoholate, of the class consisting of alkali metal methylates and alkali metal ethylates, in the corresponding alcohol as a reaction medium at a temperature from 65-80° C.

3. A process for the preparation of 5-nitro-4-methoxy-2-chlorotoluene, which comprises reacting 5-nitro-2,4-dichlorotoluene with a substantially equimolecular amount of an alkali metal methylate in methanol as a reaction medium at a temperature from 65-80° C.

4. A process for the preparation of 5-nitro-4-ethoxy-2-chlorotoluene, which comprises reacting 5-nitro-2,4-dichlorotoluene with a substantially equimolecular amount of an alkali metal ethylate in ethanol as a reaction medium at a temperature from 65-80° C.

5. A process for the preparation of 5-amino-4-alkoxy-2-chlorotoluene, wherein the alkoxy group contains 1-2 carbon atoms, which comprises reacting 5-nitro-2,4-dichlorotoluene with an alkali metal alcoholate, of the class consisting of alkali metal methylates and alkali metal ethylates, in the corresponding alcohol as a reaction medium at a temperature from 65-80° C., the amount of said alcoholate not substantially exceeding 1 mol per mol of 5-nitro-2,4-dichlorotoluene, separating 5-nitro-4-alkoxy-2-chlorotoluene from the reaction mixture, and reducing the nitro group to an amino group.

6. 5-nitro-4-alkoxy-2-chlorotoluene, wherein the alkoxy group contains 1-2 carbon atoms.

7. 5-nitro-4-methoxy-2-chlorotoluene.

8. 5-nitro-4-ethoxy-2-chlorotoluene.

BERNARD W. ROTTSCHAEFER.

REFERENCES CITED

The following references are of record in the file of this patent:

UNITED STATES PATENTS

| Number | Name | Date |
|---|---|---|
| 695,812 | Julius et al. | Mar. 18, 1902 |
| 1,564,214 | Derick et al. | Dec. 8, 1925 |
| 2,007,234 | Wirth | July 9, 1935 |
| 2,056,261 | Dahlen et al. | Oct. 6, 1936 |
| 2,186,367 | Coleman et al. | Jan. 9, 1940 |
| 2,312,801 | Craig et al. | Mar. 2, 1943 |
| 2,370,524 | Denison et al. | Feb. 27, 1945 |